Nov. 22, 1927.
Re. 16,791
B. M. HAWK
GRAVITY TOY
Original Filed June 21, 1926
FIGURE 2
FIGURE 1
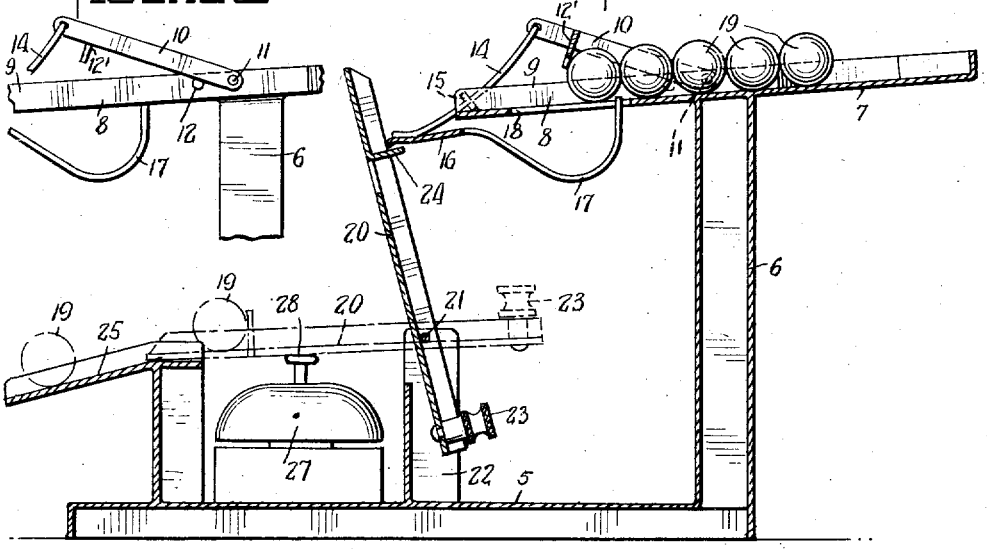
FIGURE 3
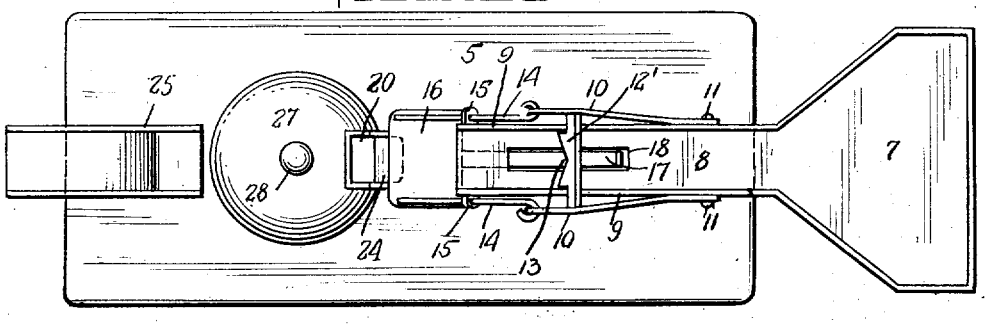
FIGURE 4
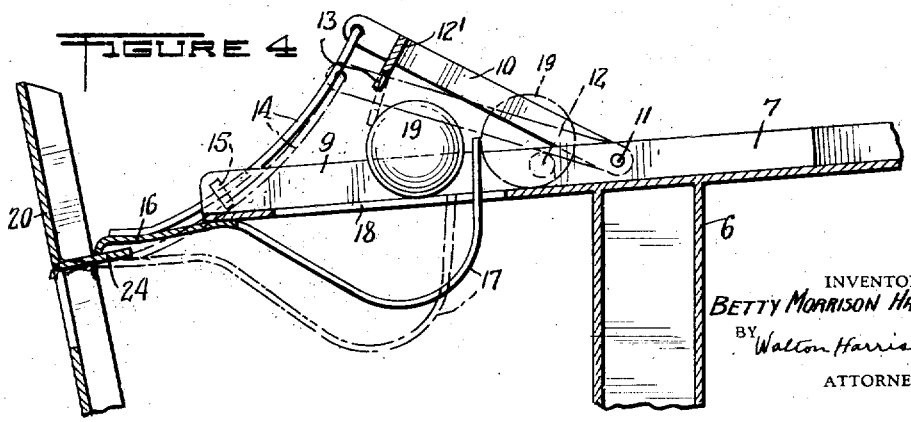
INVENTOR
BETTY MORRISON HAWK
BY Walton Harrison
ATTORNEY Reissued Nov. 22, 1927. Re. 16,791

UNITED STATES PATENT OFFICE.

BETTY MORRISON HAWK, OF FLORENCE, COLORADO.

GRAVITY TOY.

Original No. 1,617,846, dated February 15, 1927, Serial No. 117,519, filed June 21, 1926. Application for reissue filed March 2, 1927. Serial No. 172,178.

My invention relates to gravity operated toys.

An important object of the invention is to provide a device of the above mentioned character, which is interesting to watch in operation and which is of such simple construction that it may be manufactured cheaply.

A further object of the invention is to provide a device of the above mentioned character, which is wholly automatic in operation.

Other objects and advantages of the invention will be apparent during the course of the following description.

In the accompanying drawings, forming a part of this specification, and in which like numerals are employed to designate like parts throughout the same, Figure 1 is a central vertical longitudinal section through a toy embodying my invention, Figure 2 is a side elevation of the delivery trough, Figure 3 is a plan view of the entire device, and Figure 4 is a central vertical longitudinal section through the delivery trough, showing the forward ball holding element in the raised releasing position and the rear ball holding element in the raised holding position.

In the drawings, wherein for the purpose of illustration is shown a preferred embodiment of my invention, the numeral 5 designates a base, having a post or standard 6 rigidly attached to one end thereof. This standard is vertical and carries a forwardly inclined tray 7, tapering forwardly, and leading into a forwardly inclined delivery trough or chute 8. This trough or chute is approximately U-shaped in cross section, and has side walls 9, as shown.

Co-acting with the delivery trough or chute 8 is a feeding device, embodying a pair of levers 10, which are pivoted to the side walls of the trough 8, to swing vertically, as shown at 11. The downward movement of these levers 10 is limited by stationary stops 12. Arranged between the levers 10, near their forward or free ends, is a transverse upper forward ball-holding element or plate 12′, rigidly attached thereto, by any suitable means. This element 12′ has its lower end in the form of a generally V-shaped edge 13, to conform generally to the shape of the ball or rolling element. Pivotally connected with the forward ends of the levers 10, are curved rods or links 14, which are slidably mounted within apertured ears or guides 15, rigidly attached to the side walls 9. The openings of the ears 15 are slightly larger than the rods or links 14, so that they may partake of slight turning movement therein. The links or rods 14 extend forwardly beyond the chute or trough 8 and are rigidly attached to a combined trough extension and trip element 16, arranged beneath the discharge end of the trough, and extending forwardly beyond the same, and constituting in effect a continuation of the trough or chute. The numeral 17 designates a curved rear lower ball holding element, in the form of a strip, which is rigidly secured to the rear end of the combined trip element and extension 16. The rear holding element 17 has its rear end bent upwardly and operates within a longitudinal slot 18. When the combined trip element and extension is in the forwardmost position, the upper end of the holding element 17 is substantially flush, with the bottom of the trough or chute 8, and hence the forward ball or rolling element 19 is adapted to roll forwardly over the holding element 17, to engage behind the holding element 12.

Working in conjunction with the combined trip element and extension 16 is a swinging actuating trough or element 20, which is generally U-shaped in cross section. The actuating trough or element 20 is pivoted between its ends, as shown at 21, to a vertical standard 22, which is rigidly mounted upon the base 5. The rear end of the actuating element or trough 20 carries a weight 23, which automatically swings the element to the raised position, Figure 1, when it is released. The actuating element or trough 20 swings in a vertical plane longitudinally of the base 5, and when it swings upwardly, it strikes against the combined trip element and extension 16, moving it rearwardly. The actuating element or trough is provided near and spaced from its free delivery end, with a partition 24, to prevent the balls from rolling rearwardly upon the same.

The numeral 25 designates a receiving trough or chute extending longitudinally of the base 5 and attached to a vertical standard 26, which is rigidly secured to the base 5. The standard 26 is shorter than the standard 22, and hence when the actuating element or trough 20 is swung forwardly to the lowermost position, so that its free end enters the rear end of the trough 25, the actuating element or trough 20 will be inclined forwardly.

I preferably arrange a bell 27, upon the base 5 between the standards 22 and 26. This bell is sounded by actuating a reciprocatory plunger 28, which is arranged in the path of travel of the actuating element or trough 20.

The operation of the device is as follows: In Figure 1, the delivery trough 8 is shown as containing a number of rolling elements or balls 19 and the toy is ready to be started. The actuating element or trough 20 is in the raised position, resting against the trip element or extension 17, but does not move the same from the forwardmost position. Hence the upper holding element 12 engages in advance of the forwardmost ball 19, while the rear holding element 16 is in the lowermost position, and its upper end is flush with the bottom of the trough 8. To set the device into action, the actuating element or trough 20 is manually shifted to the lowermost position, and then released. When this element 20 swings upwardly, it strikes the combined trip element and extension 16, shifting it rearwardly, as shown in Figure 4. The upper holding element 12 is elevated and releases the forwardmost ball 19, and prior to the releasing of this forwardmost ball, the lower holding element has moved upwardly sufficiently so that its free end is arranged in advance of the next ball, thereby preventing the discharge of more than one ball. The released ball travels forwardly from the trough 8, and passes over the combined trip element and extension 16, and enters the upper end of the actuating element or trough 20, swinging the same forwardly and downwardly, whereby the ball is delivered into the trough 25. As soon as the actuating element 20 moves forwardly to disengage the combined trip element and extension 16, such extension and trip element, gravitates forwardly and downwardly. When the rear holding element 17 descends downwardly, sufficiently, to permit of the feeding movement of the next ball 19, the upper holding element also descends, and will engage such ball, preventing its discharge from the trough 8, until the combined trip element and extension 16 is again shifted rearwardly and upwardly, as described. When the actuating element 20 is swung downwardly, by the ball held therein, the actuating element strikes the plunger 28, thus ringing the bell. A signal is, therefore, given upon each stroke of the actuating element.

It is to be understood that the form of my invention, herewith shown and described is to be taken as a preferred example of the same, and that various changes in the shape, size and arrangement of parts may be resorted to, without departing from the spirit of my invention, or the scope of the subjoined claims.

Having thus described my invention, I claim:—

1. In a mechanical toy, an inclined trough for the reception of rolling element or elements, a lever pivoted near the trough and extending above the same, a holding element carried by the lever and adapted to be moved into the path of travel of each rolling element, a trip element arranged near the discharge end of the trough, a link connecting the trip element and lever, said lever and link constituting a part of a toggle joint, means to support the link, a second holding element carried by the trip element and adapted to be moved into the path of travel of each rolling element, and a weighted pivoted actuating element arranged near the trip element to move the same when it swings in one direction, said actuating element having a pocket to receive the released rolling element and to be shifted in an opposite direction by the same.

2. In a mechanical toy, an inclined trough for the reception of rolling element or elements and having an opening in its bottom, inclined levers pivoted near the trough and extending above the same, a holding element carried by the levers and adapted to be moved into the path of travel of each rolling element, a combined trip and extension element, arranged adjacent to the discharge end of the trough, inclined links carrying the combined trip and extension element and pivotally connected with the levers, said links and levers constituting portions of toggle joints, guide elements supporting said links, a second holding element mounted upon the combined trip and extension element and adapted to be moved thereby through the opening in the trough, and a pivoted weighted actuating element arranged near the combined trip and extension element and adapted to swing upwardly and to shift the same rearwardly, said actuating element having a pocket for the reception of the released rolling element to be swung downwardly by the same.

3. In a gravity toy the combination of an inclined trough for the reception of a rolling element, a receiving element spaced obliquely downward from said inclined trough and extending forwardly in the same vertical plane in which said inclined trough extends, an actuating element disposed adjacent said inclined trough and said receiving element, and mounted to rock into one position for receiving said rolling element from said inclined trough and into a different position for delivering said rolling element into said receiving element, said actuating element being so journaled as to swing forwardly with the rolling element in the general vertical plane of travel of said rolling element as it moves along said inclined trough, said actuating element being controllable by the weight of said rolling element as said actuating element moves from its first mentioned position to its second mentioned position and thus conveys said rolling element from said inclined trough to said receiving element, and means for swinging said actuating element from its second mentioned position to its first mentioned position.

4. In a gravity toy the combination of an inclined trough for the reception of a rolling element, a receiving element spaced obliquely downward from said inclined trough and forwardly in the same vertical plane in which said inclined trough extends, an actuating element disposed adjacent said inclined trough and said receiving element, said actuating element being mounted to rock into a position to receive said rolling element from said inclined trough and to rock into a different position for delivering said rolling element into said receiving element, said actuating element being so journaled as to swing forwardly from the lower end of said inclined trough and in the general vertical plane of travel of said rolling element relatively to said inclined trough, said actuating element being controllable by the weight of said rolling element in making its rocking movement last mentioned, thus conveying said rolling element from said inclined trough to said receiving element, means for rocking said actuating element from its last mentioned position to its first mentioned position, and mechanism controllable by the rocking movement of said actuating element for releasing said rolling element from said inclined trough.

5. In a gravity toy the combination of an inclined trough for holding a rolling element, a receiving element situated obliquely downward from said inclined trough and extending forwardly therefrom in the same vertical plane in which said inclined trough extends, an actuating element disposed adjacent said inclined trough and said receiving element and journaled to rock in said vertical plane back and forth between said receptacle and said receiving element for the purpose of conveying said rolling element from said receptacle and in said vertical plane to said receiving element, and controllable for this purpose by the weight of said rolling element, said actuating element being so positioned and arranged relatively to other parts that the travel of said rolling body is always in the same general direction from its starting point, reckoning horizontally from said starting point.

6. In a mechanical toy, an inclined trough for the reception of rolling elements, a pair of holding elements to alternately engage with each rolling element for controlling its movement, means to move the holding elements in the same direction, an actuating element to receive the rolling elements from the trough and to operate said means, said actuating element being pivoted to swing in the same vertical plane in which said trough is inclined, and means for receiving the rolling element from the actuating element.

7. In a mechanical toy, an inclined trough for the reception of rolling element or elements, a pair of holding elements to alternately engage with each rolling element for controlling its movement, a weighted actuating element to receive the rolling elements from the trough and thereafter to release them, said actuating element being pivoted to swing in the same vertical plane in which said trough is inclined, and mechanism connected with said holding element and controllable by movements of said actuating element, to move the holding elements in the same direction.

BETTY MORRISON HAWK.